April 27, 1954  D. BRODY ET AL  2,676,348
COMBINED WINDSHIELD CLEANER AND COIN RECEPTACLE
Filed Feb. 17, 1951
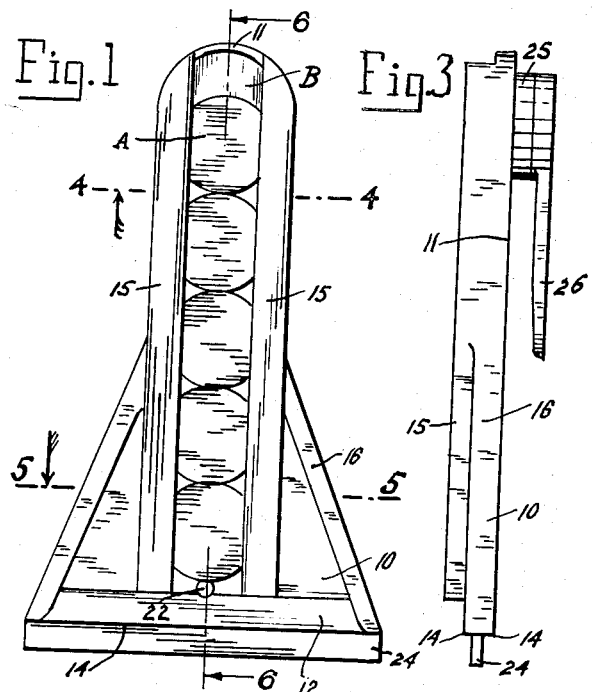
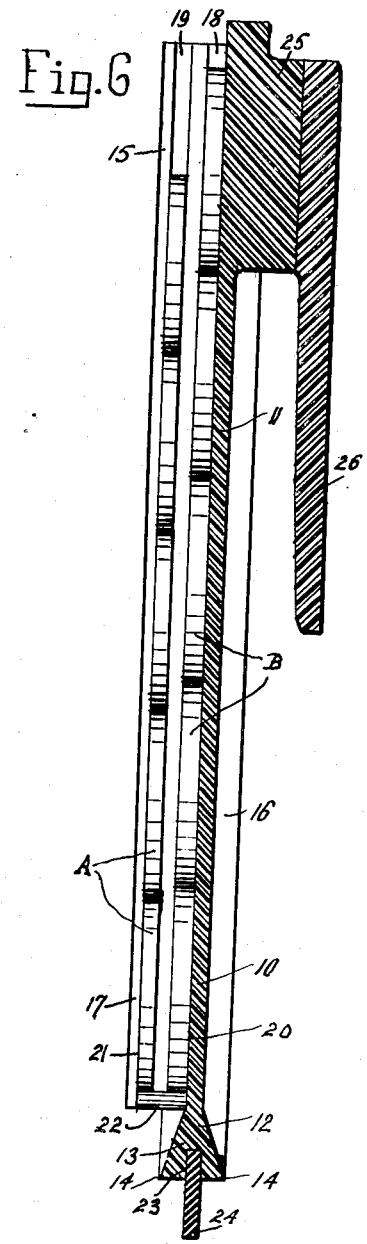
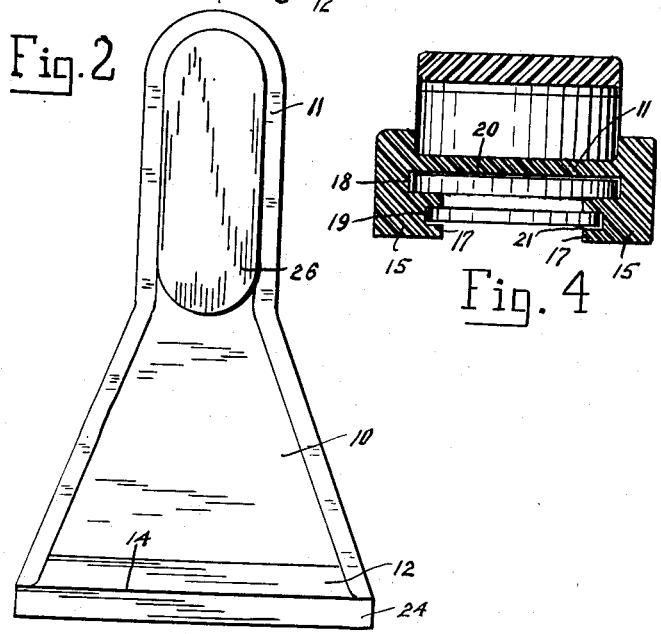
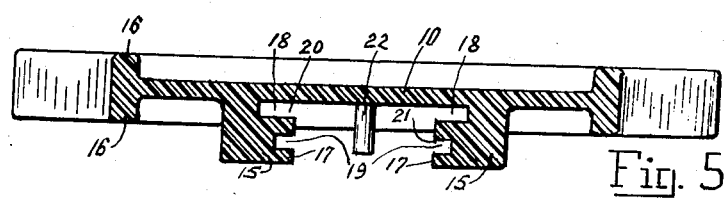
INVENTORS:
David Brody &
Sidney Coleman
by Sigmund Herzog
attorney.

Patented Apr. 27, 1954

2,676,348

UNITED STATES PATENT OFFICE 2,676,348

COMBINED WINDSHIELD CLEANER AND COIN RECEPTACLE

David Brody, Clinton, and Sidney Coleman, Maynard, Mass., assignors to Van Brode Milling Co., Inc., Clinton, Mass., a corporation of Massachusetts Application February 17, 1951, Serial No. 211,567

1 Claim. (Cl. 15—105)

The present invention relates to improvements in an implement which is especially adapted for the use of automobilists. More particularly, the invention pertains to an implement for cleaning the windshield and windows of motor vehicles, being of the surface scraper type designed to remove snow and ice from the outer surfaces of said windshields and windows.

The main object of the invention is to provide an implement of the character mentioned which is capable of being molded of plastic material.

Another object of the invention is to strengthen the handle and scraper body of the tool by means of a rib or ribs extending along substantially the entire length of the handle and scraper element of the tool, and so shaping said rib or ribs that they form a receptacle for holding coins, such as cents and nickels, which are adapted to be conveniently withdrawn when required for insertion into parking meters.

A still further aim of the invention is to provide an implement of the character referred to which is simple in construction, efficient in operation, and capable of manufacture on a commercial scale or, in other words, one which is not so difficult to produce as to be beyond the reasonable cost of such a contrivance.

Other objects and advantages will be apparent during the following detailed description.

One of the many possible embodiments of the invention is illustrated in the accompanying drawings, in which:

Figure 1 is a front elevation of the improved implement;

Figure 2 is a rear elevation of the same;

Figure 3 is a side elevation thereof;

Figure 4 is a section taken on line 4—4 of Fig. 1, on a larger scale;

Figure 5 is a section taken on line 5—5 of Fig. 1, on a larger scale; and

Figure 6 is a section taken on line 6—6 of Fig. 1, also on a larger scale.

In the drawings, the numeral 10 indicates the body portion of the scraper element and the numeral 11 the handle thereof. They are formed of flat, rigid sheet material, the handle lying in the plane of said body portion. The base 12 of the scraper element is thickened throughout its width, it being substantially triangular in transverse cross-section, as clearly indicated at 13 in Fig. 6 of the drawings, thereby presenting two wedge-shaped edges 14, either one of which may be used to scrape off adherent snow or ice from the outer surface of the windshield or windows of a motor vehicle. In order to strengthen the structure, there are formed on one face of the same two spaced ribs 15, which extend through substantially the entire length of the device. In addition, some of the edges of the implement are thickened, as shown at 16.

The ribs 15 are spaced apart a distance to permit the insertion of a finger of the user's hand, for a purpose hereinafter to be described. In the sides 17 of the ribs 15 facing one another, there are formed two sets of registering grooves 18 and 19, extending throughout the length of said ribs. The grooves 18 form a channel 20 which is wider than the channel 21, formed by the grooves 19. Across the lower ends of the channels extends a pin 22, formed upon or attached to that face of the implement on which the ribs 15 are provided. This pin constitutes a stop for coins placed one on top of another in the two channels above mentioned. The narrower channel is dimensioned to accommodate cents, denoted in the drawings by the character A, and the wider channel fits nickels, designated in the drawings by the character B. The coins are placed into the channels through the open upper ends of the same, and may be withdrawn therefrom one after another by a finger of the user.

In the lower face of the thickened base 12 of the scraper element is formed a mortise 23, which runs throughout the width of the base and has fitted therein one edge of a soft rubber strip 24, forming a squeegee for removing moisture from the inner faces of the windshield and windows of a car.

On the upper end of the rear face of the handle 11 is formed a boss 25, to which is attached, for instance, by a suitable cement a clip 26. This clip extends substantially parallel to the rear face of the handle and serves to fasten the implement to a support, for instance to the sun visor which is usually located above the windshield of the motor vehicle. The implement is thus kept in readiness for use with the open ends of the coin holding channels uppermost, so that the coins are prevented from leaving the coin receptacle.

The implement is made of a suitable plastic material which is adapted to be readily molded, thereby providing an inexpensive tool. The clip, being formed of plastic material, is resilient enough to securely hold the implement on its support.

In use, the implement is held by means of its handle at an acute angle to the surface to be scraped with one of its wedge-shaped edges 14 in contact with the material to be removed from said surface and moved back and forth to displace the adherent matter.

If moisture is to be wiped off the inner surfaces of the windshield or other windows of the vehicle, the squeegee is made use of.

If cents or nickels are needed for insertion into a parking meter, the user removes the required coin or coins from the coin receptacle by inserting a finger of one hand into the space between the ribs 15 into contact with the uppermost coin in the respective channel, sliding the coin along the channel until it is in a position ready to be grasped for complete removal.

What we claim is:

A combination tool made of plastic material comprising a scraper body, a handle made integral therewith extending in the plane of said scraper body, said body and handle being of sheet-like configuration, two spaced strengthening ribs on one of the faces of said body and handle extending substantially throughout the length of the tool, the sides of said ribs facing one another being provided with registering grooves forming channels adapted to receive rows of coins, one of said channels being defined by said ribs and one of the faces of said scraper body and said handle, and means on said body located at the lower ends of said channels for preventing egress of coins thereat.

References Cited in the file of this patent

UNITED STATES PATENTS

| Number | Name | Date |
| --- | --- | --- |
| 416,163 | Hanson | Dec. 3, 1889 |
| 2,517,247 | Seley | Aug. 1, 1950 |
| 2,561,687 | Craig | July 24, 1951 |
| 2,563,940 | Krasberg | Aug. 14, 1951 |
| 2,569,629 | Everitt | Oct. 2, 1951 |
| 2,616,554 | Wade et al. | Nov. 4, 1952 |